United States Patent Office 3,148,554
Patented Sept. 15, 1964

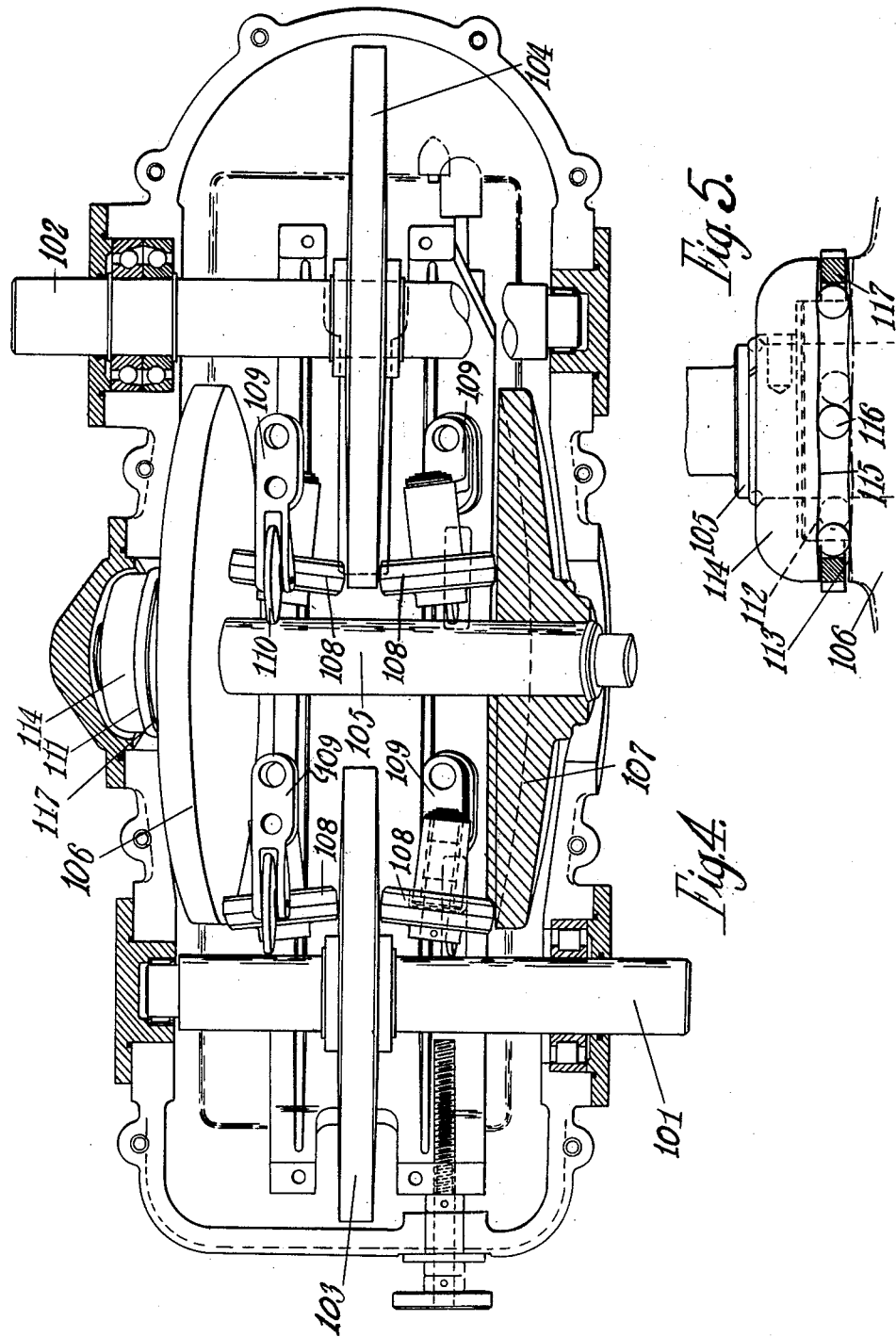

3,148,554
FRICTION DRIVEN, STEPLESSLY VARIABLE
SPEED GEARING
William Robinson Andrews, E. Buck Lane, Otley,
Yorkshire, England
Filed Aug. 20, 1962, Ser. No. 217,916
Claims priority, application Great Britain Nov. 29, 1961
2 Claims. (Cl. 74—196)

This invention relates to friction driven, steplessly variable speed gearing, and is an improvement in or modification of the invention described and claimed in my co-pending application Serial No. 99,288, filed March 29, 1961, Patent Number 3,115,044.

In the said co-pending application there is described and claimed friction driven, steplessly variable speed gearing including at least two friction discs secured in fixed spaced relation on a shaft, at least one friction disc located between said spaced discs in overlapping and inclined relation thereto affording V formations between the relatively inclined discs, and a rotatable motion transmitting member disposed in each of said V formations, in which the faces of the friction discs are so formed that in changing the gear ratio the centres of the motion transmitting members engaging opposite faces of a disc located between the rigidly spaced discs are each moved in a plane which is normal to a line dividing the angle between the relatively inclined shafts, and the said centres are also moved in a line of the said plane which intersects the axes of the said shafts, and including means for maintaining the members during their traverse motion in a neutral position such that they have no inherent tendency to move either to increase or to decrease the gear ratio.

In the preferred embodiment of the invention the means for maintaining the motion transmitting members in neutral position comprises cam or equivalent means each having a relatively inclined flat surface and arranged on opposite sides of the centre of the shaft carrying the rigidly spaced discs, each cam face being parallel to the plane of movement of the member when changing the gear ratio.

In operation of such a gear (for the details of which reference may be had to the specification of the co-pending application aforementioned) one set of power transmitting rollers, i.e. the rollers engaging one of the fixed spacing friction discs, is urged back against its cam face and the other set is urged into the V formed between the discs. It has been found that, due to the elasticity of the parts the set of power transmitting rollers urged into the V formation moves and, in so doing, leaves its neutral position. The rollers then tend to move in a direction to change the gear ratio. The flexibility of and the clearances between the moving faces of the roller carriage will allow a limited amount of movement so that the rollers on one side of the centre disc or discs will be at a slightly different radius from the rollers on the opposite side and because of this the two fixed spaced discs, forming a sort of dumbbell, will have a tendency to be driven at different speeds; this cannot happen because they are rigidly connected and some slip is therefore inherent.

It will be understood that if these discs are now urged together the displaced rollers will be brought back to their neutral position to eliminate the inherent slip introduced.

According to the present invention, therefore, one of the two friction discs on the shaft, in gearing of this type is free to rotate on the shaft through at least a limited angle and means is provided to urge the said disc towards the other disc on the shaft during such rotation.

Thus on a tendency to slip occurring, the discs will be urged together and the tendency to slip will be removed by returning the power transmitting rollers to neutral position so that the differential rotation will cease.

Preferably he urging means comprises a climbing ball or roller device between the freed disc and a part rigid with the shaft.

The invention will be further described with reference to the accompanying drawings of a gearing according to the invention of my earlier application 99,288 and of a preferred embodiment of gearing according to the invention.

In the drawings:

FIGURE 4 is a sectional view of the gearing arrangement according to the present invention; and FIGURE 5 is an enlarged view of a detail of FIGURE 4.

Figure 1:
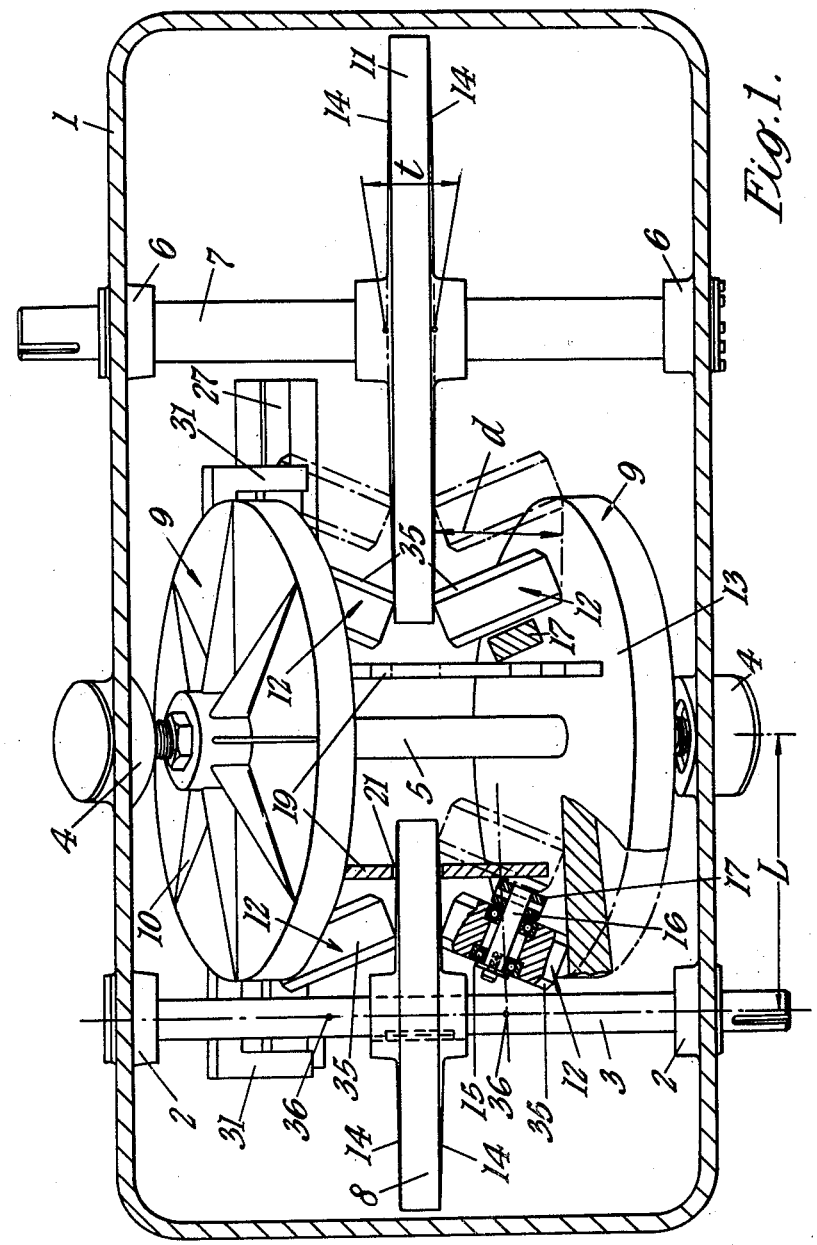
FIGURE 1 is a plan view, partly in section and with certain parts omitted, of a friction driven steplessly variable speed gearing constructed in accordance with one form of the invention of my said earlier application.
Figure 2:
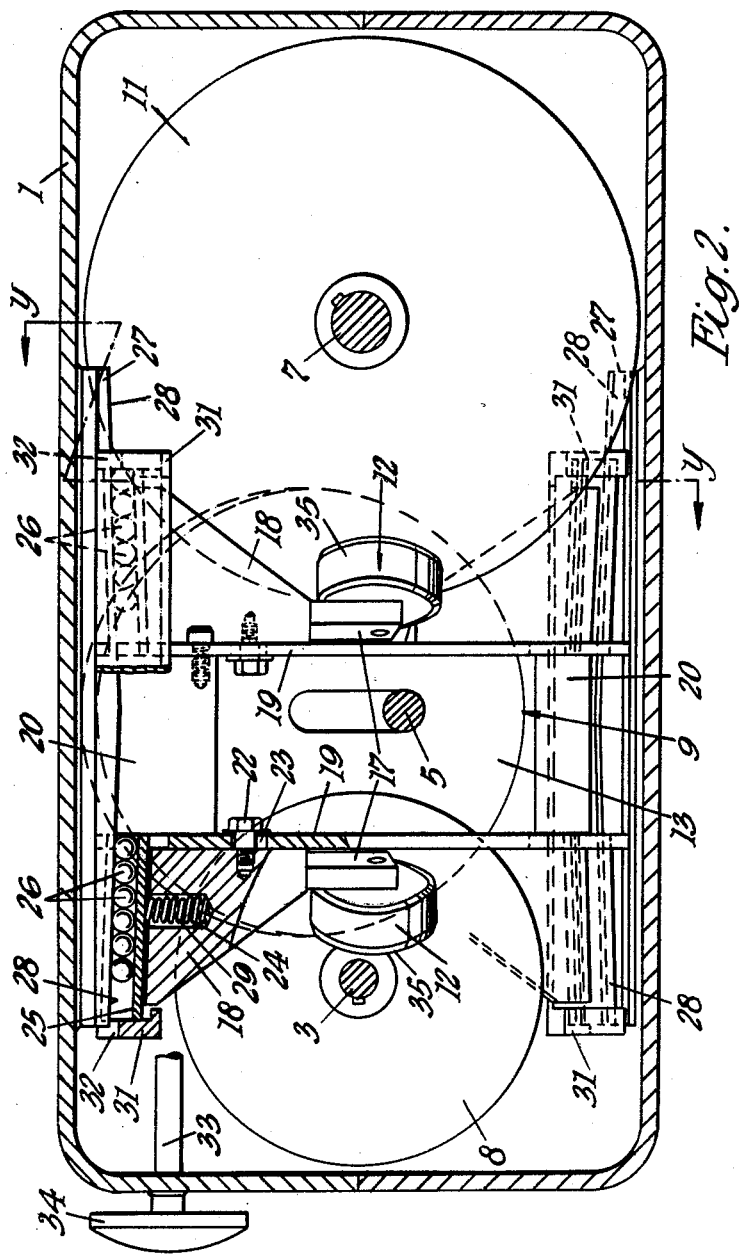
FIGURE 2 is a side elevation of FIGURE 1 with one of the rigidly spaced discs omitted and including a section on the line x—x of FIGURE 3.
Figure 3:
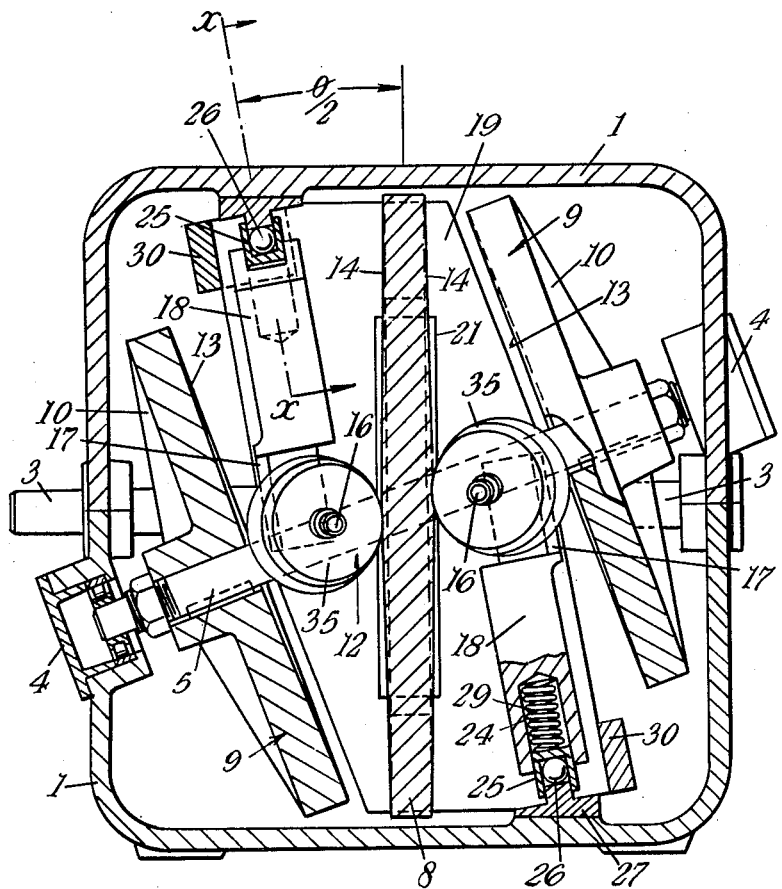
FIGURE 3 is a composite section on the line y—y of FIGURE 2 with the output shaft omitted.

As shown in FIGURES 1, 2 and 3 of the drawings, there is provided in the construction of my earlier patent a casing 1 having bearings 2 for an input shaft 3, bearings 4 for a centre shaft 5, and bearings 6 for an output shaft 7. An intermediate friction disc 8 is secured to the input shaft 3. Two friction discs 9 are secured in rigidly spaced relation upon the centre shaft 5 and the outer faces of these discs have radial reinforcing ribs 10. An intermediate friction disc 11 is secured to the output shaft 7, the arrangement being such that the two intermediate friction discs 8 and 11 lie in the same plane and extend between the rigidly spaced discs 9 to overlap these discs. The input and output shafts 3 and 7 are parallel and lie in the same plane, and the centre shaft 5 is inclined as seen in FIGURE 3 so as to afford V formations between the inner faces of the two discs 9 and the opposite faces of the intermediate discs 8 and 11 on the input and output shafts respectively. The illustrated inclination of the shaft 5 is exaggerated as later explained. A motion transmitting roller 12 is disposed in each of the aforesaid V formations so that rotary motion can be transmitted from the disc 8 to the discs 9, and from the latter to the disc 11. Also relative motion between the rollers and the discs engaged thereby in a direction to change the distances between the respective pairs of rollers and the centres of the discs engaged thereby effects a stepless change in the gear ratio. The internal faces 13 of the rigidly spaced discs 9 have the form of shallow cones extending inwardly towards the shaft axis as shown in FIGURE 3. Also the opposite faces 14 of the intermediate discs 8 and 11 have the form of shallow cones which taper outwardly towards their peripheries. Each of the rollers 12 is rotatably mounted by means of a ball bearing 15 upon a spindle 16 secured to a bracket plate 17 forming part of a carrier 18 of plate-like and generally triangular shape. There are four carriers 18, one for each of the four rollers. Each carrier is slidably mounted on a carriage comprising parallel side plates 19 connected by spacing members 20, the side plates 19 being slotted as seen at 21 in FIGURE 1 to admit the intermediate friction discs 8 and 11. The slidable mounting of the carriers 18 referred to above is effected by a bolt 22 secured to the carrier and extending through a slot 23 in the side plate 19. A slot 24 in the outer end of each carrier 18 receives a rectangular channel shaped slide 25 containing a series of bearing balls 26. The open end of each of the slides 25 extends over and is guided by a cam member 27. There are two of these cam members 27 as seen in FIGURE 2, and they are secured respectively to the top and bottom of the casing 1. Each cam member 27 has two relatively inclined cam faces 28 with the central apex of the two faces either vertically above or vertically below the axis of the shaft 5 carrying the rigidly spaced friction discs 9. The bearing balls 26 engages the cam faces 28, and loading springs 29 (see FIGURE 3) are provided to press each of the carriers 18 outwardly so that the rollers 12 are pressed into the V formations afforded by the friction discs.

Carriage guide members 30 are attached to the carriage plates 19 at the top and bottom thereof and have inwardly angled ends 31 each of which is formed with a slot 32 (FIGURE 2) which engages over the rectangular cross section of the cams 27 so as to guide the carriage in a rectilinear path between the input and output shafts 3 and 7 and in a direction perpendicular to the axes of the said shafts. Such movement of the carriage is effected by means of a speed control spindle 33 (FIGURE 2) rotatably mounted in the casing 1 so as to prevent axial movement, and having a hand control disc 34. The inner end of the spindle 33 (not shown) is provided with a thread engaged in a threaded socket forming part of the carriage structure whereby the carriage can be displaced in a conventional manner. Alternatively a rack and pinion arrangement may be employed for this purpose.

The motion transmitting rollers indicated generally at 9 consist of relatively thick cylindrical discs the peripheral edges of which are chamfered as shown at 35. Gear changing is effected by displacing the carriage structure by rotating the control disc 34 and thereby traversing the rollers between the discs as shown by the full and broken line positions in FIGURE 1, the extent of the traverse being seen from FIGURE 1. During this motion the left hand rollers shown in FIGURE 1 move inwardly, i.e. away from the input shaft 3 in convergent paths over the coned faces of the friction disc 8, and the right hand rollers move towards the output shaft 7 in convergent paths over the coned faces of the friction disc 11. The effect of the cams 27 acting on the roller carriers is that the rollers 12 are guided during their traversing movement so that they always occupy a neutral position, i.e. one in which there is no inherent tendency for them to move in a direction. The neutral positions of the rollers may be defined as those positions in which the centres of the rollers lie on a line joining the centres of the adjacent shafts in the plane of roller movement. It will be seen from FIGURE 1 that the rollers engaged with opposite faces of the friction disc 11 for example will be moved during gear changing in paths or planes which are inclined to a plane perpendicular to the disc shaft at an angle which is half the angle between the relatively inclined disc shafts. Also it will be seen from FIGURE 1 that in gear changing the rollers 12 are moved in a plane which is inclined to a plane perpendicular to the intermediate disc shaft, which plane intersects the centre of a hypothetical motion transmitting member positioned at the centre of the disc faces, e.g. at either of the points 36 in FIGURE 1.

In the arrangement illustrated the distance L between the input shaft 3 and the shaft 5 is approximately two thirds the distance between the shaft 5 and the output shaft 7; and the plane of the motion transmitting rollers 12 bisects the angle between the discs. In these circumstances the conical taper of the friction discs is determined by the formula $$\frac{\frac{d+t}{2}(1-\cos\theta)}{\sqrt{L^2+\left(\frac{d+t}{2}\right)^2\sin^2\theta}}$$

where $d$ is the effective diameter of the rollers, $t$ is the axial spacing between the hypothetic apices of the coned intermediate disc faces if continued to the centre of the disc shaft, and $\theta$ is the angle between the relatively inclined shafts.

In operation of this gear one set of rollers 12 coupling a pair of shafts is urged back against its cam face 28 and the other set is urged into the V formed between the discs. As previously mentioned, the elasticity of the parts may allow the latter set to move out of neutral position so that there is a tendency to change the gear ratio. Under these circumstances the flexibility of the roller carrier 18 and the clearance between its moving faces, will allow a limited amount of movement of the roller, so that the roller 12 on one side of the disc 8 or 14 will be at a slightly different radius from the roller in the opposite side. Because of this the disc 9 will tend to be driven at different speeds so that some slip will be introduced.

According to the present invention, this tendency is harnessed to urge the discs 9 together to restore the rollers to their neutral positions and remove the tendency to slip.

As depicted in FIGURES 4 and 5 the gearing according to the invention includes parallel input and output shafts 101 and 102, on which are mounted friction discs 103 and 104, an inclined intermediate shaft 105 on which are mounted friction discs 106 and 107. Rollers 108 engage the friction discs and are movable on carriages 109 to vary the transmission ratio. The carriages 109 have followers 110 (only two of which are shown in FIGURE 4) bearing on cam faces (not shown) in the manner described with reference to FIGURES 1 to 3.

As stated above, there is a tendency in operation for either the lower or the upper pair of rollers 109 (depending on the direction of rotation of the shafts), to be driven into the V formed between the friction discs with which they co-operate, while the other pair tends to be driven towards the cam face. Because of this there is a tendency for the discs 107 and 106 to be driven at different speeds so that there will be some slip unless a correction is applied.

In order to supply such a correction, disc 106 is mounted on the shaft 105, for at least a limited rotation and axial movement and a climbing ball or roller device 111 is arranged on rotation of the disc 106 to urge it towards the disc 107, which is fixed on the shaft 105. The displaced rollers will thus be returned to their neutral positions wherein there is no inherent tendency to change gear.

FIGURE 5 shows some detail of the climbing ball device 111 and its relationship with the shaft 105 and disc 106.

It will be seen that the disc 106 is formed with a reduced diameter hub 112 and a shoulder 113. The shoulder is formed with a series of depressions. A collar 114 is rigidly mounted on the shaft 105 and its face 115 opposite the shoulder 113 is formed with a series of depressions corresponding with the depressions in the shoulder. A ball 116 is located in the chambers defined by a pair of opposed depressions, the hub 112 and an outer ball cage 117.

The balls are normally located in the bottoms of the depressions so that when the disc 106 rotates on the shaft 105, it is also forced axially away from the collar 114.

Various modifications may be made within the spirit and scope of the invention.

I claim:

1. Friction driven, steplessly variable speed gearing including a housing, a first shaft rotatably mounted in said housing, at least two friction discs spaced on said first shaft, a second shaft rotatably mounted in said housing and inclined to said first shaft, at least one friction disc on said second shaft and located between said spaced discs in overlapping and inclined relationship thereto affording V formations between the relatively inclined discs, a rotatable motion transmitting member disposed in each of said V formations, and means for traversing said rotatable motion transmitting members in a transverse direction to vary the speed ratio between the shafts in which the faces of the friction discs and the traversing means are so formed that in changing the gear ratio the centres of the motion transmitting members engaging opposite faces of the disc located between the said spaced discs are each moved in a plane which is normal to a line dividing the angle between the relatively inclined shafts, and the said centres are also moved in a line in the said plane which intersects the axes of the shafts, wherein of the spaced friction discs is fixedly mounted on the first shaft and the other is free to rotate thereon through at least a limited angle, means being provided to urge the said other disc towards the said one disc during such rotation.

2. Friction driven, steplessly variable speed gearing as claimed in claim 1, wherein said urging means is in the form of a climbing ball device between the freed disc and a part rigid with the said first shaft.

References Cited in the file of this patent

UNITED STATES PATENTS

| | | |
|---|---|---|
| 568,367 | Osgood | Sept. 29, 1896 |
| 1,683,715 | Erban | Sept. 11, 1928 |
| 1,738,965 | Renia | Dec. 10, 1929 |
| 2,209,254 | Ahnger | July 23, 1940 |
| 2,512,717 | Dicke | June 27, 1950 |
| 3,010,330 | Perruca | Nov. 28, 1961 |

FOREIGN PATENTS

| | | |
|---|---|---|
| 58,372 | France | June 24, 1953 |
| 601,764 | Canada | July 19, 1960 |